Aug. 14, 1923.

H. C. STALEY 1,465,098

WASHING APPARATUS

Filed Oct. 20, 1919

Witness:
G. S. Evans

INVENTOR.
Homer C. Staley
BY White & Prost
his ATTORNEYS.

Aug. 14, 1923.
H. C. STALEY
WASHING APPARATUS
Filed Oct. 20, 1919
1,465,098
2 Sheets-Sheet 2
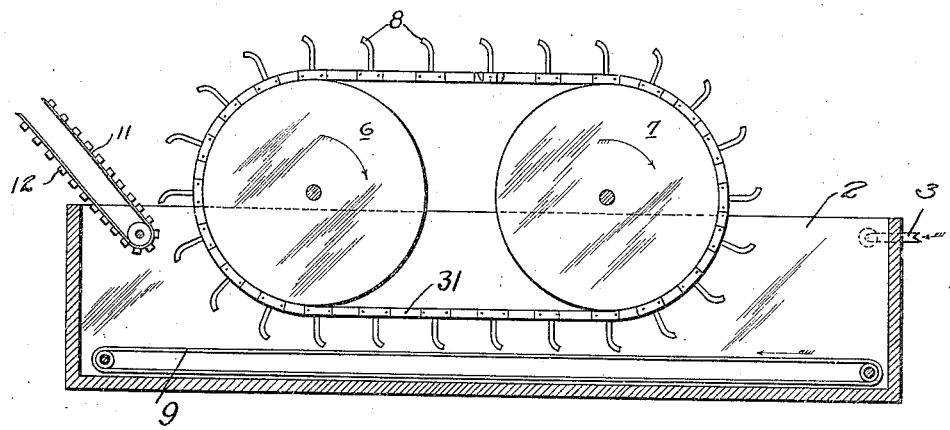
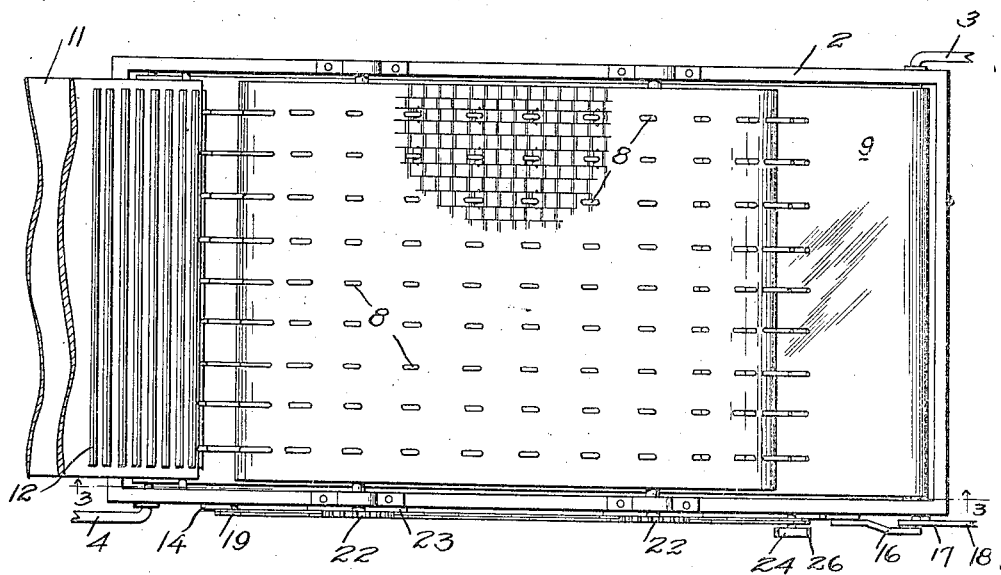
INVENTOR.
Homer C. Staley
BY
his ATTORNEYS.

Patented Aug. 14, 1923.

1,465,098

UNITED STATES PATENT OFFICE.

HOMER C. STALEY, OF OAKLAND, CALIFORNIA, ASSIGNOR TO HUNT BROTHERS PACKING COMPANY, OF SAN FRANCISCO, CALIFORNIA, A CORPORATION OF CALIFORNIA.

WASHING APPARATUS.

Application filed October 20, 1919. Serial No. 331,943.

*To all whom it may concern:*

Be it known that I, HOMER C. STALEY, a citizen of the United States, and a resident of Oakland, in the county of Alameda and State of California, have invented certain new and useful Improvements in Washing Apparatus, of which the following is a specification.

My invention relates to machines for washing articles especially vegetables and fruits.

An object of the invention is to provide a machine for the thorough washing of spinach and similar leaf vegetables.

Another object of the invention is to provide a machine for washing the skins from fruits after the skins have been loosened by treatment in a lye or other solution.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 3 is a vertical sectional view of another embodiment of my invention, the plane of section being indicated by the line 3—3 of Figure 4, which is a plan view of the apparatus shown in Figure 3.

Vegetables such as spinach are particularly hard to cleanse from adhering particles of dirt and sand which lodge in the folds and creases of the leaves in such a manner that an ordinary current of water will not dislodge them. I have therefore devised means for giving the vegetables or other articles or material a back-and-forth, reciprocating or shaking motion in a stream of water, approximating the movement imparted by the hands when such materials are manually washed. Fruits such as peaches from which the skins have been loosened or partially disintegrated by a lye or other solution may also be passed through my apparatus to wash off the skins.

Figure 1:
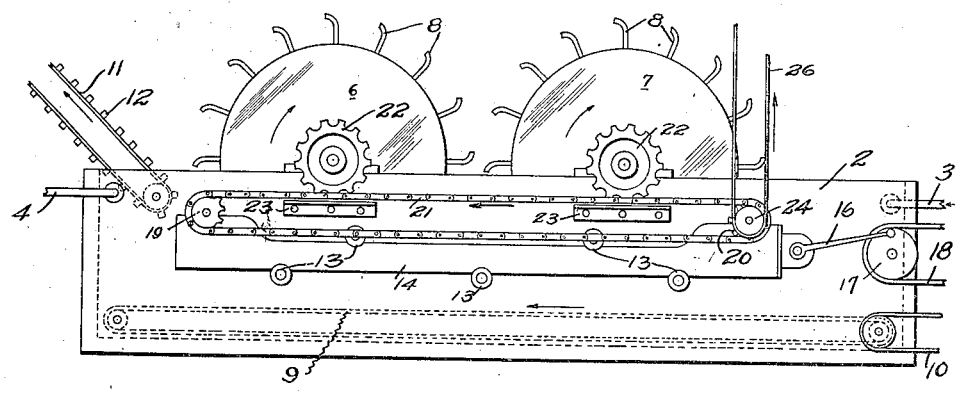
Figure 1 is a side elevation of one form of my washing apparatus.
Figure 2:
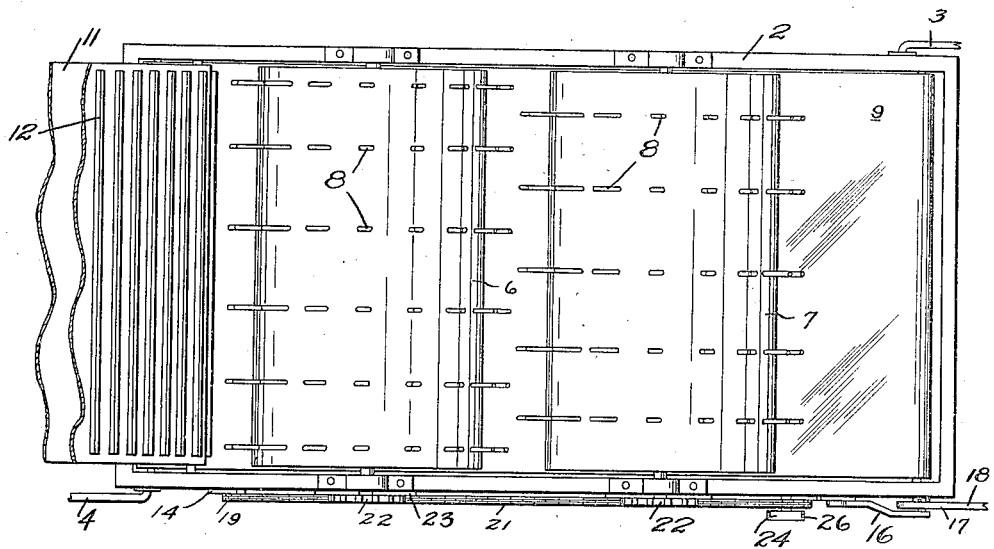
Figure 2 is a plan view of the structure shown in Figure 1.

As shown in Figures 1 and 2, my washing apparatus comprises a tank 2 through which water flows entering through pipe 3 and discharging through pipe 4. Two drums 6 and 7 are rotatably mounted in bearings arranged on the edges of the tank and are provided with pins 8 having blunt ends curved backwardly in respect of the direction of rotation. Preferably arranged below the drums in the bottom of the tank is a feed draper 9, the upper reach of which passes closely adjacent the ends of the pins 8. The draper is driven at a slow speed by the belt 10 from a conveniently disposed power shaft. A second draper 11 preferably with slats 12 thereon is arranged at the discharge end of the tank to carry out the washed material.

Means are provided for imparting to the drums 6 and 7 an interrupted but progressive rotary movement in the direction shown by the arrows, the forward movements being alternated with reverse movements through a smaller arc. The resultant motion in respect of the pins 8 is a back-and-forth or reciprocating or shaking one, which thoroughly washes the material lodged upon the pins. This motion is supplemented by an interrupted forward rotary movement of the drums which carries the material onward through the machine.

Mounted for reciprocating motion upon the grooved rollers 13 arranged on the side of the tank, is a slide or plate 14, connected by pitman 16 with the crank disk 17 rotated from a suitably disposed power shaft by the belt 18. Sprocket wheels 19 and 20 are mounted at the ends of the reciprocating plate and are connected by a chain 21, the upper reach of which also engages sprockets 22 secured to the shafts of the drums 6 and 7. In order to prevent disengagement of the chain from the sprockets 22, a plate 23 is secured below each sprocket, the chain passing between the two. On the same shaft with sprocket 20 is a pulley 24 which is driven by belt 26 from a power shaft located vertically above the middle position of the pulley during the reciprocation of the slide 14. The rotation of the pulley 24 is relatively much slower than that of the pulley 17. With the slide stationary, the chain 21 would of course rotate the drums continuously forward in the direction indicated by the arrows, but with the reciprocation of the slide, the characteristic reciprocatory rotary motion of the drums is produced, the speed of the forward movement being determined by the sum of the speeds of the slide and the chain, and the speed of the reverse movement by their difference. Since both movements of each phase occur during an equal period of time, it follows that during the forward movement the drums rotate through a greater arc than during the reverse movement, and the difference in the length of these arcs is the net forward gain of each phase, resulting in a slow rotation of the drums in addition to the reciprocating movement.

The vegetable or material to be washed is thrown into the tank at the end shown at the right in the figures of the drawing. Floating pieces are caught directly by the pins 8, while the material that sinks is carried by the feed draper 9 toward the first drum 7 and the pins thereon. Caught by the pins, the material is repeatedly shaken or moved back and forth in the water and at the same time given a progressive movement toward the second drum, where the process is repeated. It is not intended that the material shall be carried around on the drums. The curved ends of the pins facilitate the disengagement of the material which drops back into the water as the pins rise toward a horizontal position above the water. By the time the material has passed the second drum it has been shaken clear of all adhering particles and thoroughly washed. As the washed material reaches the discharge end of the tank, it lodges on the slatted draper 11 and is carried out of the machine and permitted to fall into an appropriate receptacle.

In Figures 3 and 4 I have shown an embodiment of my invention which differs from that just explained by the inclusion of a steel doormat belt 31 arranged upon the drums. In this case the pins 8 are secured by rivets to the links of the belt and are arranged in parallel rows upon the belt as shown in Figure 4.

The operation of the apparatus is the same as that first described but with the added advantage that the vegetables or other material being washed are kept submerged continuously during their progress through the tank, the lower reach of the belt preventing the material from rising to the surface between the drums. This construction possesses a further advantage in that the distance between the drums may be made such as to give a longer washing period than is possible with the Figure 1 construction.

From the above, it will be clear that the pins not only shake the material in the tank back and forth in the washing liquid, but together with the surface of the drums or belt, impart to it a steady forward movement toward the discharge end of the tank. For this reason I do not consider the inclusion of the feed draper 9 essential to the operation of the apparatus and I may omit this element from the structure.

I claim:

1. A washing apparatus comprising a tank adapted to contain washing liquid, a drum rotatably supported in said liquid, means on the drum for catching material to be washed, a slide, means for reciprocating the slide, and means arranged on the slide for imparting to the drum a rotary motion comprising forward movements alternated with reverse movements of less extent than the forward movements.

2. A washing apparatus comprising a tank adapted to contain washing liquid, a drum rotatably supported in said liquid, means on the drum for catching material to be washed, a slide arranged on the tank, means for reciprocating the slide, a pair of sprockets on said slide, a chain on said sprockets, means for rotating one of said sprockets, and a sprocket on said drum shaft engaging said chain.

3. A washing apparatus comprising a tank adapted to contain washing liquid, a drum in said liquid, means on the drum for catching material to be washed, means for imparting to the drum a reciprocating rotary motion and an interrupted progressive rotary motion, and a feed draper disposed longitudinally of the tank adjacent the lower portion of the drum.

4. A washing apparatus comprising a tank adapted to contain washing liquid, drums rotatably supported in said liquid, means on the drums for catching material to be washed, a slide, means for reciprocating the slide, means arranged on the slide for imparting to the drums a rotary motion comprising forward movements alternated with reverse movements of less extent than the forward movements, and means for removing the washed material from the tank.

5. A washing apparatus comprising a tank adapted to contain washing liquid, means for introducing said liquid into and discharging it from said tank, a pair of drums rotatably mounted on said tank and partially submerged in said liquid, a belt on said drums, pins on said belt for catching material to be washed, a slide arranged on the side of the tank, a crank disk and pitman for reciprocating the slide, a pair of sprockets on said slide, a chain on said sprockets, a sprocket on said drum shafts engaging said chain, means for rotating one of the pair of sprockets and the crank disk, and a draper for removing the washed material from the tank.

In testimony whereof I have hereunto set my hand at San Francisco, California, this 14th day of October, 1919.

HOMER C. STALEY.